(12) United States Patent
Steprath (10) Patent No.: US 7,357,036 B2
(45) Date of Patent: Apr. 15, 2008

(54) FORCE MEASURING APPARATUS AND STRAIN MEASURING ELEMENT

(75) Inventor: Werner Steprath, Dormagen (DE)

(73) Assignee: Bosch Rexroth AG, Stuttgart (DE)

( * ) Notice: Subject to any disclaimer, the term of this patent is extended or adjusted under 35 U.S.C. 154(b) by 145 days.

(21) Appl. No.: 11/318,275

(22) Filed: Dec. 23, 2005

(65) Prior Publication Data

US 2007/0006669 A1 Jan. 11, 2007

(30) Foreign Application Priority Data

Feb. 5, 2005 (DE) ...................... 10 2005 005 354

(51) Int. Cl.
  *G01B 7/16* (2006.01)
  *G01L 1/22* (2006.01)
(52) U.S. Cl. .............. 73/767; 73/768; 73/776; 73/862.632; 73/862.637
(58) Field of Classification Search .......... 73/767–768, 73/774–776, 782, 862.474, 862.57, 862.627–862.629, 73/862.632, 862.636–862.637
See application file for complete search history.

(56) References Cited

U.S. PATENT DOCUMENTS

| | | | | |
|---|---|---|---|---|
| 3,033,034 A | * | 5/1962 | Ziggel | 73/774 |
| 3,780,817 A | * | 12/1973 | Videon | 177/136 |
| 3,782,182 A | * | 1/1974 | Starr | 73/782 |
| 4,047,427 A | | 9/1977 | Young | |
| 4,059,012 A | * | 11/1977 | Pietzsch et al. | 73/862.629 |
| 4,064,744 A | * | 12/1977 | Kistler | 73/766 |
| 4,095,659 A | * | 6/1978 | Blench et al. | 177/136 |
| 4,203,318 A | | 5/1980 | Yorgiadis | |
| 4,367,656 A | | 1/1983 | Fritsch | |
| 4,576,053 A | * | 3/1986 | Hatamura | 73/862.629 |
| 4,884,453 A | * | 12/1989 | Hoffmann et al. | 73/776 |
| 5,222,398 A | * | 6/1993 | O'Brien | 73/862.632 |
| 2004/0079163 A1 | * | 4/2004 | Clerc et al. | 73/774 |

FOREIGN PATENT DOCUMENTS

| | | |
|---|---|---|
| DE | 41 03 765 A1 | 8/1992 |
| EP | 0 789 234 A | 8/1997 |
| GB | 853 755 | 11/1960 |

* cited by examiner

*Primary Examiner*—Edward Lefkowitz
*Assistant Examiner*—Jonathan Dunlap
(74) *Attorney, Agent, or Firm*—Martin A. Farber (57) ABSTRACT

A force measuring apparatus comprises has a force-transmitting component, that holds a strain measuring element with a carrier element and a displacement transducer. The carrier element has two fixing sections at a predefined distance from each other in a direction of the strain with which it is fixed to the component. Furthermore, the carrier element has a strain section, which is provided between the fixing sections and which has a shorter length in the direction of the strain than the distance between the fixing sections, and which has a smaller cross section than the remaining carrier element. The displacement transducer is connected to the strain section in order to register the strain of the strain section.

18 Claims, 8 Drawing Sheets

FORCE MEASURING APPARATUS AND STRAIN MEASURING ELEMENT

FIELD AND BACKGROUND OF THE INVENTION

The invention relates to a force measuring apparatus in the form of a force-transmitting component having a strain measuring element which is held on the component and which converts the force-dependent strain of the component into an electric signal. Furthermore, the invention relates to a strain measuring element which registers the force-dependent strain of a component.

A tensile force sensor is disclosed by DE 41 03 765 A1. A link plate which has an eye at each of its two longitudinal ends is provided with a cylindrical depression from two sides in the region between the eyes. Adhesively bonded to the base of the depressions is a strain gage serving as a strain measuring element. The link plate is, for example, inserted into the force flow of a crane transporting a load. In this case, the link plate is deformed in accordance with the force with which it is loaded. The deformation of the link plate in the same way deforms the strain gage adhesively bonded to the base of the depression. In the process, the electric output signal from the strain gage changes in accordance with the deformation of the strain gage.

The known force sensor is provided in order to measure forces in rough crane or ship operation up to an order of magnitude of several hundred tons. If, by contrast, smaller forces are to be measured, the deformation of the link plate as a function of the loading is too small to obtain a usable electric output signal from the strain gage.

The invention is based on the object, in a force measuring apparatus of the type mentioned at the beginning, of improving the resolution, that is to say in particular of obtaining a larger electric output signal with the same deformation of the force-transmitting component.

SUMMARY OF THE INVENTION

According to the invention, this object is achieved by a force measuring apparatus and a strain measuring element having features set forth in the claims.

As a result of the two-part construction of the strain measuring element used from a carrier element and a displacement transducer, and as a result of the special shape of the carrier element, which registers the strain over a great length of the component and projects it onto a small section of reduced cross section, on which the displacement transducer is arranged, the force-dependent deformation of the force-transmitting component is amplified. By means of the increase in the deformation of the carrier element achieved in this way in the region of the displacement transducer, the result is a corresponding increase in the electric output signal from the displacement transducer. Thus, on a component which, for example, is designed appropriately strongly in order to accommodate a mechanical bending load, a tensile load superimposed independently of the bending load can be measured reliably.

Advantageous developments of the invention are presented in the claims.

A recess in the component, above which the strain section and the sections of the carrier element adjacent thereto are arranged, ensures the free mobility of the carrier element with respect to the component in the section between the fixing sections. As a result, the different lengthening of individual sections of the carrier element is reliably permitted. The arrangement of the strain measuring element on the base of a depression in the component protects said strain measuring element against mechanical damage. If the depression is configured in such a way that the strain measuring element is located in the region of the neutral axis of the component, then the output signal from the displacement transducer is independent of a bending load of the component. Simple reliable fixing results from adhesive bonding of the fixing sections of the carrier element to the component. Toothing the fixing sections of the carrier element and corresponding opposite toothing on the component improve the strength of the connection.

In a particularly preferred refinement, the fixing of the carrier element to the component is carried out via a clamped connection. As a result of the clamped connection, a frictional connection is made between carrier element and component. Thus, no external stresses caused by the fixing act on the strain measuring element, so that the strain measuring element measures the strain precisely and reliably without compensation. In addition, the provision of a clamped connection achieves overload protection for the strain measuring element. The clamped connection is preferably formed as a cover, which is held on the component and covers the depression, and pins clamped in between the cover and the carrier element. This achieves a simple clamped fixing which is capable of compensating for even relatively large fabrication tolerances during the fabrication of the depression. For this purpose, the length of the pins is preferably dimensioned such that they project beyond the edge of the depression, and the cover can be deformed plastically while maintaining residual elasticity.

The strain measuring element is preferably formed as a preassembled structural unit to be inserted into a depression in the component and, in addition to the carrier element and the displacement transducer, has at least one cover to cover the depression, an electronic amplifier circuit in order to amplify an electric signal from the displacement transducer, and an elastic potting compound provided between the cover and the carrier element and partly enclosing the strain measuring element. In this case, the side of the fixing sections facing a base of the depression is in each case not covered by the potting compound. Such a structural unit can be integrated into existing components with little effort on installation and makes the fabrication of force sensors easier. As a result of the integration of an amplifier circuit in the preassembled structural unit, transmission faults in the displacement transducer signal can be avoided. In addition, the amplifier circuit provides a measured signal which is robust and suitable for motor vehicle use. The potting compound protects the displacement transducer and the amplifier circuit against damage as a result of weathering or penetrating dirt.

The displacement transducer is advantageously formed as a strain gage or as a magneto-elastic transmitter. The carrier element is advantageously formed as a ceramic circuit board and provided with one or more thin-layer strain gages.

In order to measure the force with which an attachment held on an agricultural machine acts on the latter, the strain measuring element is arranged in a depression of a lower link of a lifting mechanism, via which the attachment is held on the agricultural machine. In this case, the depression for accommodating the strain measuring element is advantageously arranged in the vicinity of the machine-side eye of the lower link. The component for holding the strain measuring element can also be formed as a link plate which, at each of its longitudinal ends, is provided with an eye to accommodate connecting elements, such as bolts. This configuration permits universal use of the force measuring apparatus according to the invention, for example also in the force flow of lifting appliances.

BRIEF DESCRIPTION OF THE DRAWINGS

The invention will be explained in more detail in the following text with further details by using exemplary embodiments illustrated in the drawings, in which:

FIG. 4b shows a longitudinal section of the installation region of the strain measuring element, the carrier element being fixed via pins clamped in, FIG. 8b shows a section through the link plate illustrated in FIG. 4a.

DETAILED DESCRIPTION OF THE PREFERRED EMBODIMENT(S)

Figure 1:
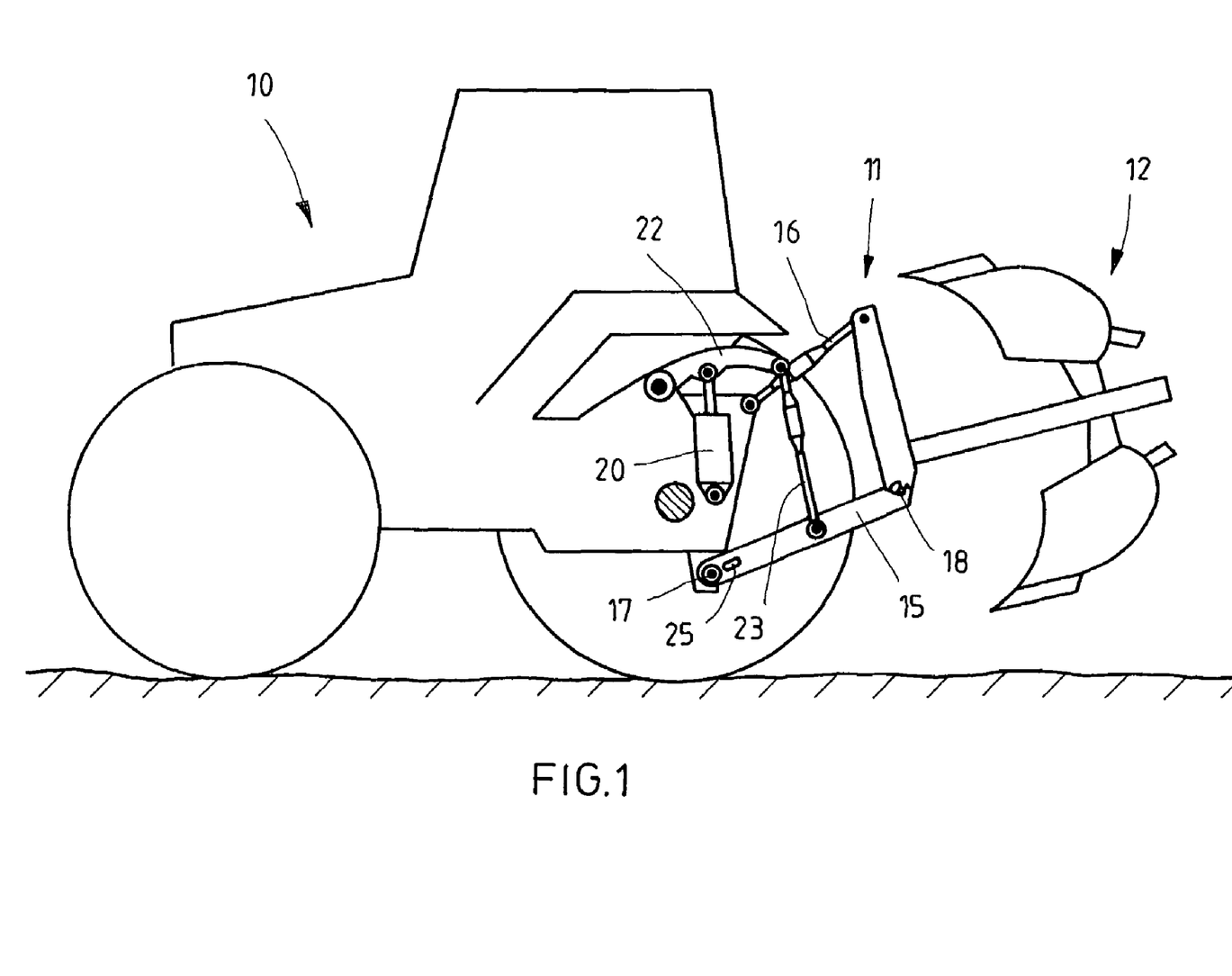
FIG. 1 shows a tractor having a lifting mechanism for a plow held on its rear.
Figure 2A:
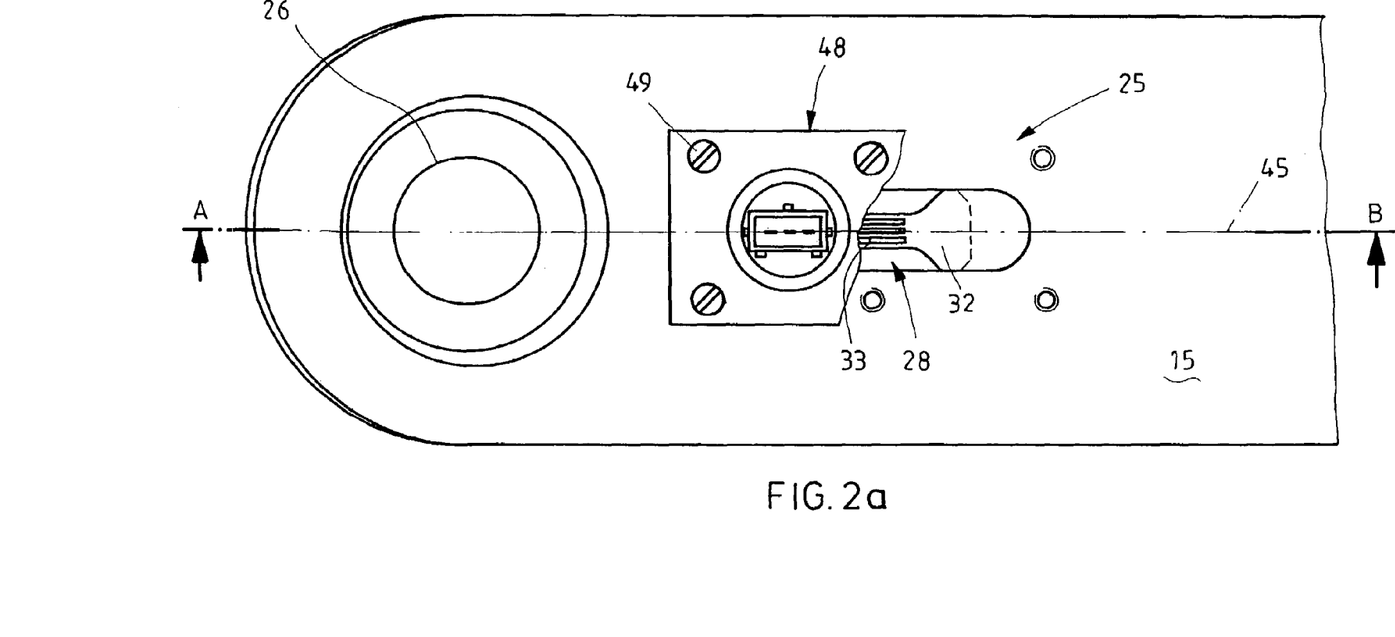
FIG. 2a shows the side view of a section of a lower link, via which the lifting mechanism is supported on the tractor.
Figure 2B:
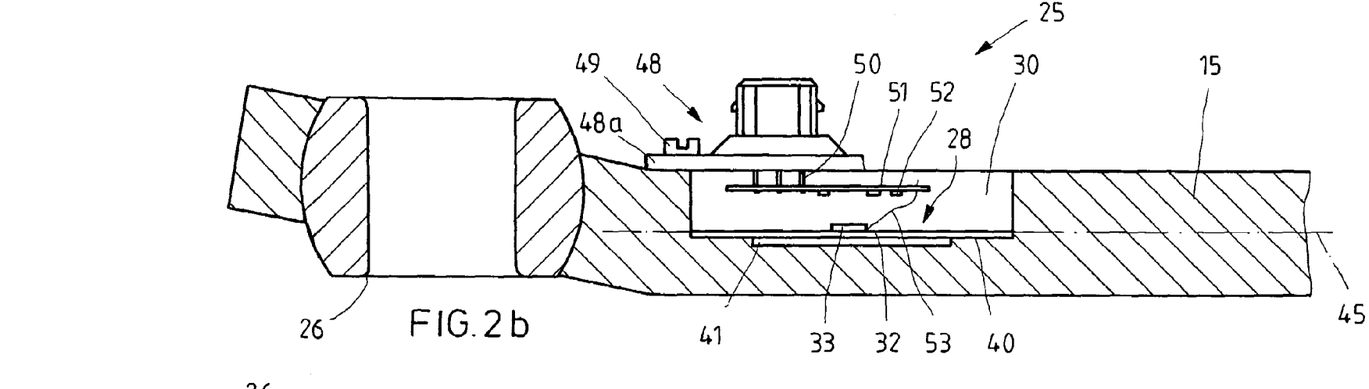
FIG. 2b shows a section A-B through the region of the lower link illustrated in FIG. 2a, FIG. 3a shows a plan view of a strain measuring element formed in accordance with the invention.

FIG. 1 shows, in a schematic illustration, a tractor 10 on the rear of which a lifting mechanism 11 with a plow 12 is held. The tractor 10 is used here as an example of an agricultural machine. The lifting mechanism 11 is supported on the rear of the tractor 10 via various links. Of these links, a lower link 15 and an upper link 16 are illustrated in FIG. 1. The lower link 15 is held on the tractor 10 via a first rotary joint 17. An attachment such as the plow 12 is held on the lower link 15 via a second rotary joint 18. The lower link 15 is provided with an eye at each of its longitudinal ends, which in each case forms part of the rotary joints 17 and 18. Such an eye is illustrated in FIGS. 2a and 2b. A hydraulic cylinder 20 raises and lowers the lifting mechanism 11 via a linkage formed by a lever 22 and a rod 23. A force sensor 25 is arranged on the lower link 15 in the vicinity of the rotary joint 17. Details of the force sensor 25 are described in the following text by using FIGS. 2a to 7c.

FIG. 2a shows a subregion of the lower link 15 with an eye 26 and the force sensor 25 in an illustration greatly enlarged with respect to FIG. 1. The eye 26 is the eye of the lower link 15, which is a constituent part of the rotary joint 17. The force sensor 25 is arranged in the vicinity of the machine-side eye 26 of the lower link 15. FIG. 2b shows a section along the line A-B. The force sensor 25 substantially comprises a strain measuring element 28, which is held in a depression 30 in the lower link 15. Details of the strain measuring element 28 are illustrated in FIGS. 3a and 3b.

Figure 3A:
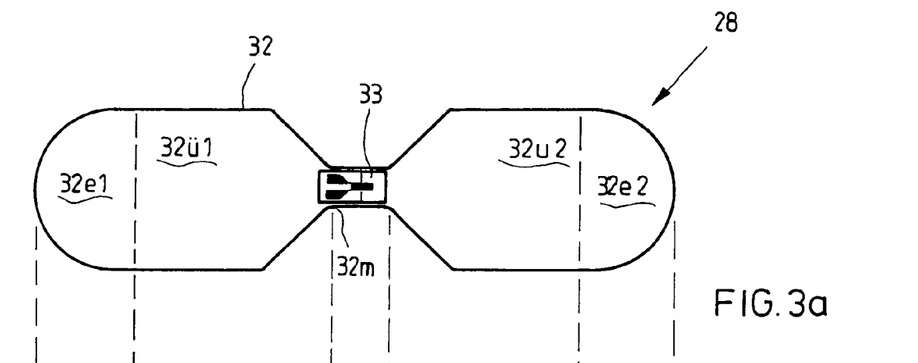
Figure 3B:
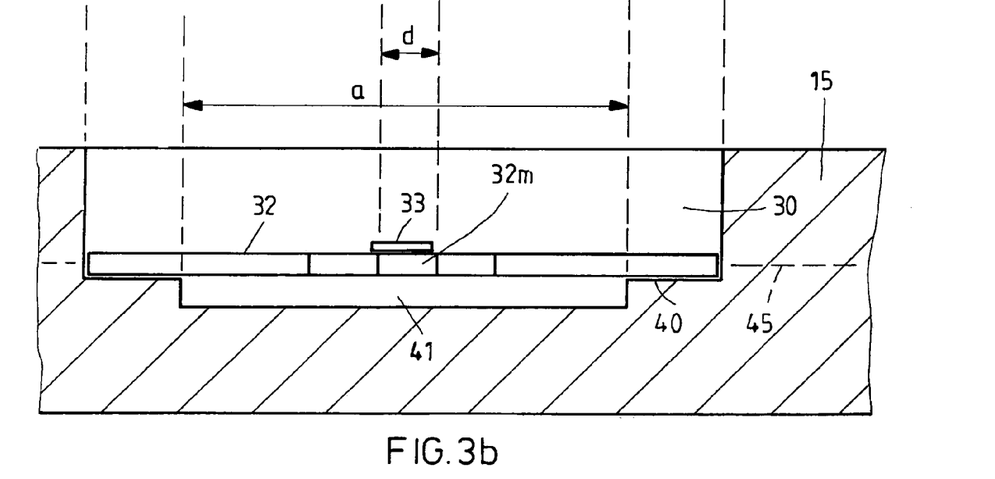
FIG. 3b shows a longitudinal section through the installation region in the lower link with a side view of the strain measuring element illustrated in FIG. 3a, FIG. 3c shows a longitudinal section of the installation region of the strain measuring element, the fixing sections being provided with toothing.

FIG. 3a shows a plan view of the strain measuring element 28 in a simplified illustration, while FIG. 3b shows a longitudinal view of the strain measuring element 28 in the installation region illustrated in FIG. 2b. The strain measuring element 28 comprises a strip-like carrier element 32 and a strain gage 33 serving as a displacement transducer. The carrier element 32 has, in its longitudinal direction, two end regions 32e1 and 32e2, a central region 32m and transition regions 32ü1 and 32ü2 located between these. The distance between the end regions 32e1 and 32e2 is designated a. The central region 32m is narrower than the end regions 32e1 and 32e2 and is also narrower than the transition regions 32ü1 and 32ü2. This means that the cross section of the carrier element 32 in the central region 32m is smaller than in the remaining regions of the carrier element 32. The strain gage 33 is firmly connected to the carrier element 32 in the central region 32m of the latter, for example by means of an adhesive connection. The strain gage 33 is oriented in such a way that it measures the strain of the central region 32m in the longitudinal direction of the carrier element 32.

As illustrated in FIGS. 2b and 3b, the carrier element 32 of the strain measuring element 28 is held on the base of the depression 30, provided with the reference symbol 40. In this case, only the end regions 32e1 and 32e2 of the carrier element 32 are fixed to the base of the depression via an adhesive connection. The two transition regions 32ü1 and 32ü2 and the central region 32m, on the other hand, are not connected to the base 40. For this purpose, the depression 30 can be provided with an additional recess 41, which is formed in such a way that the carrier element 32 rests on the base 40 of the depression 30 only in the end regions 32e1 and 32e2. The carrier element 32 can thus move relative to the lower link 15 between the end regions 32e1 and 32e2 when said lower link is acted on by a force acting in the longitudinal direction.

In addition to the tensile or compressive load, a considerable bending load acts in the vertical direction on the lower link 15 for holding and lifting an agricultural attachment (see FIG. 1). In addition, a bending load can occur transversely with respect to the towing direction. In order to measure the tensile force independently of such bending loads occurring transversely with respect to the lower link longitudinal axis, the depression 30 is formed in such a way that the strain measuring element 28 is located on the common neutral axis 45 of the lower link 15 with respect to the two bending directions. Thus, a bending load on the lower link 15 has no influence on the output signal from the displacement transducer 33.

Since the carrier element 32 is narrower in its central region 32m than in the remaining regions, it lengthens nonuniformly over its length when it is acted on by a tensile force acting in the longitudinal direction. Given a constant thickness of the carrier element 32, the lengthening depends on the width of the carrier element 32, greater lengthening of the carrier element 32 taking place in narrow regions. The invention makes use of this effect. The width of the carrier element 32 is chosen such that, under the action of a force, lengthening takes place virtually only in the central region 32m where the strain gage 33 is arranged, and such that the lengthening in the remaining regions is negligibly small. If the distance a between the end regions 32e1 and 32e2 increases by the value Δa during the action of a force, then the central region 32m and, with the latter, also the strain gage 33 is likewise increased by the value Δa. The strain gage 33 is thus lengthened to a greater extent than would be the case with a strain gage fixed directly to the lower link 15. If the length of the central region 32m is designated "d", then the output signal from the strain gage 33 is increased by the factor a/d as compared with the case in which the strain gage 33 is fixed directly to the lower link 15.

Figure 3C:
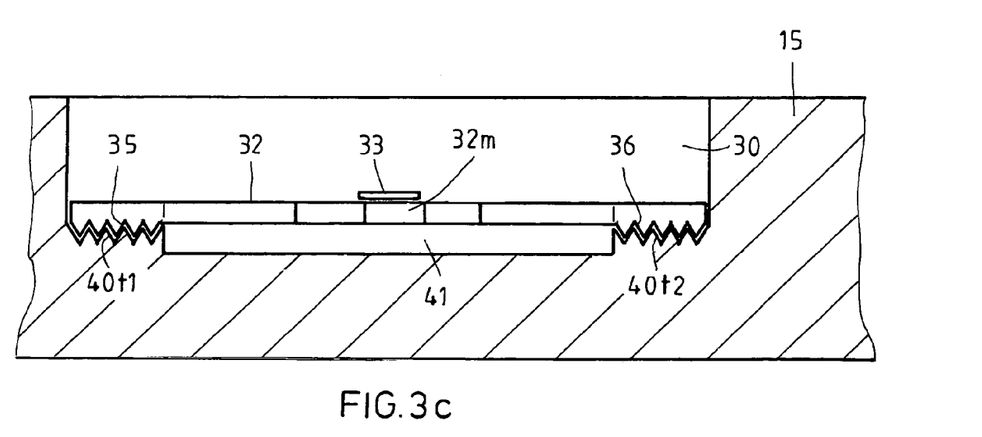

In order to increase the strength of the adhesive connection of the end regions 32e1 and 32e2 to the base 40 of the depression 30, the end regions 32e1 and 32e2 can additionally be provided with toothing 35 and 36, respectively, as illustrated in FIG. 3c. The toothing is notched toothing. In this case, the toothing 35 and 36 engages in correspondingly formed opposing toothing 40t1 and 40t2 on the base 40. In this case, there should be sufficient play between the opposite toothing in order to ensure stress-free fixing of the carrier element 32.

As illustrated in FIGS. 2a and 2b, the electrical connection of the strain gage 33 is provided via a plug 48. The plug 48 is fixed to the lower link 15 by six screws 49. In this case, the flange region 48a of the plug 48 forms a cover, so that the plug 48 covers the depression 30 completely. In order to seal off the depression 30 still better against the penetration of dust or moisture, a seal enclosing the depression 30 can additionally be arranged between the plug 48 and the lower link 15 if required. A printed circuit board 51 is held on the parts of the connecting pins 50 of the plug 48 projecting into the depression 30. The connecting pins 50 serve simultaneously as an electrical connection between the plug 48 and the printed circuit board 51. Together with the electric components 52 arranged on it, the printed circuit board 51 forms a measuring amplifier for reading and amplifying the signal from the strain gage 33. The strain gage 33 is connected to the printed circuit board 51 via connecting wires 53. The signal from the strain gage 33 is normally only a few mV. The measuring amplifier is therefore arranged as close as possible to the strain gage, in order to reduce the influence of transmission errors and interference signals. At the output from the measuring amplifier, what is obtained is a robust signal suitable for motor vehicle use, with a signal voltage between 0 V and 10 V, the unloaded state being signaled by a voltage of 5 V.

By using FIGS. 4a, 4b, 5a, 5b and 5c, alternative fixing possibilities for the strain measuring element 28, in particular the carrier element 32, will now be described. In these fixing variants, the carrier element 32 is connected to the base 40 of the depression 30 by a frictional connection at its outer end sections 32e1 and 32e2. To this end, a clamped fixing is provided, which presses the end sections 32e1 and 32e2 onto the base 40 of the depression 30. If appropriate, the contact surfaces are roughened in order to achieve a stronger frictional connection.

Figure 4A:
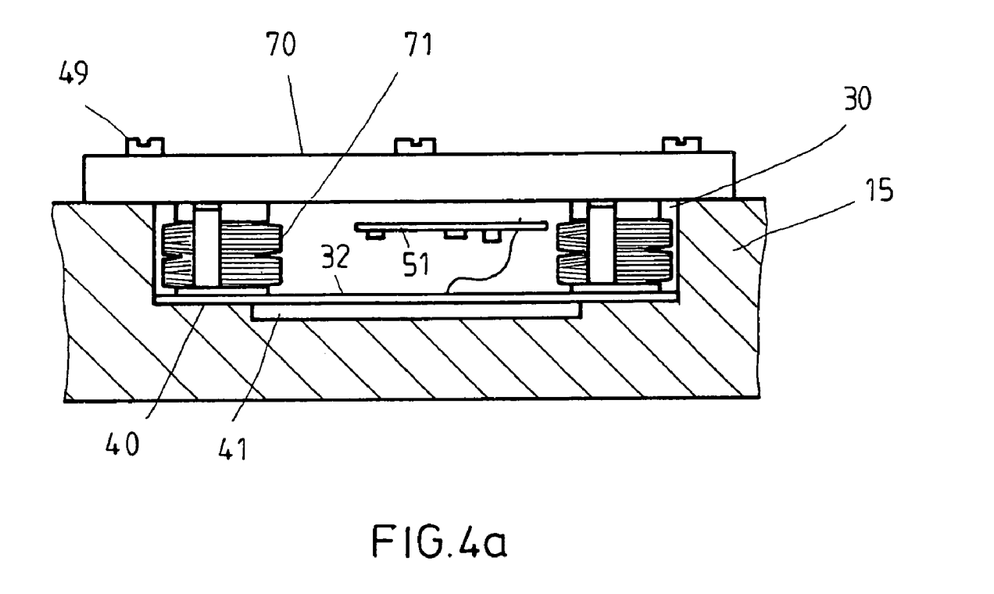
FIG. 4a shows a longitudinal section of the installation region of the strain measuring element, the carrier element being fixed via spring packs.

As illustrated in FIG. 4a, the depression 30 is covered by a cover 70 fixed to it. The cover 70 is screwed to the lower link 15 by screws 49. Clamped in between the cover 70 and the carrier element 32 are spring packs 71, which press the end sections 32e1, 32e2 (see FIGS. 3a, 3b) of the carrier element 32 onto the base 40. In this case, the pressing force is chosen such that the frictional connection produced thereby reliably transmits the strain forces which are needed in order to lengthen the carrier element 32. Since the carrier element 32, in particular the central region 32m, has only a small cross section, the strain forces required to lengthen it are very low.

Figure 4B:
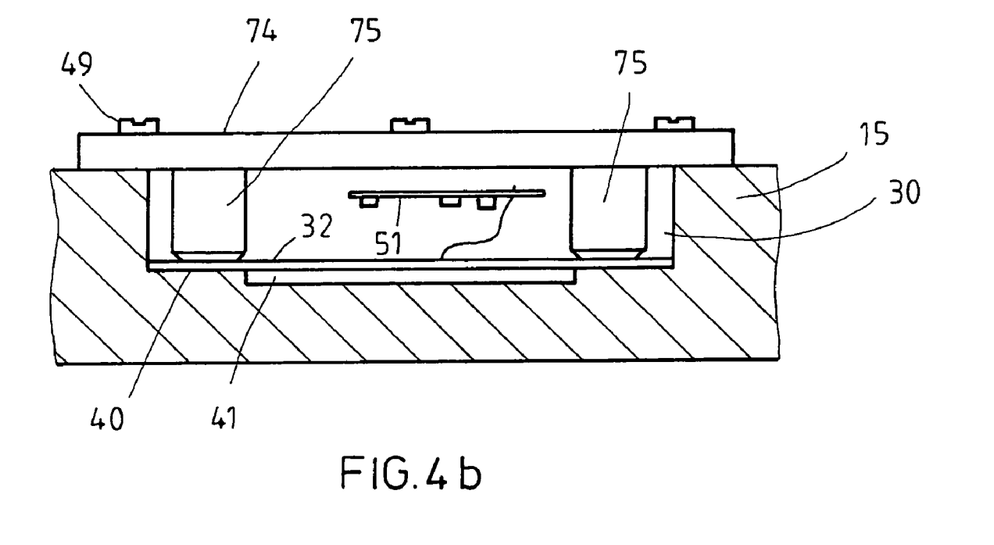

A further variant of the clamped fixing is illustrated in FIG. 4b. Pins 75 are clamped in between a cover 74, which is screwed to the lower link 15, and the carrier element 32. By means of the pins 75, the end sections 32e1, 32e2 of the carrier element 32 are pressed onto the base 40 of the depression 30. A recess 41 ensures that only the end sections 32e1, 32e2 of the carrier element 32 are connected to the lower link 15. The clamping force on the pins 75 is applied by means of elastic deformation of the cover 74. The fixing of the cover 74 and the clamping of the pins 75 is illustrated in FIGS. 5a, 5b and 5c.

Figure 5A:
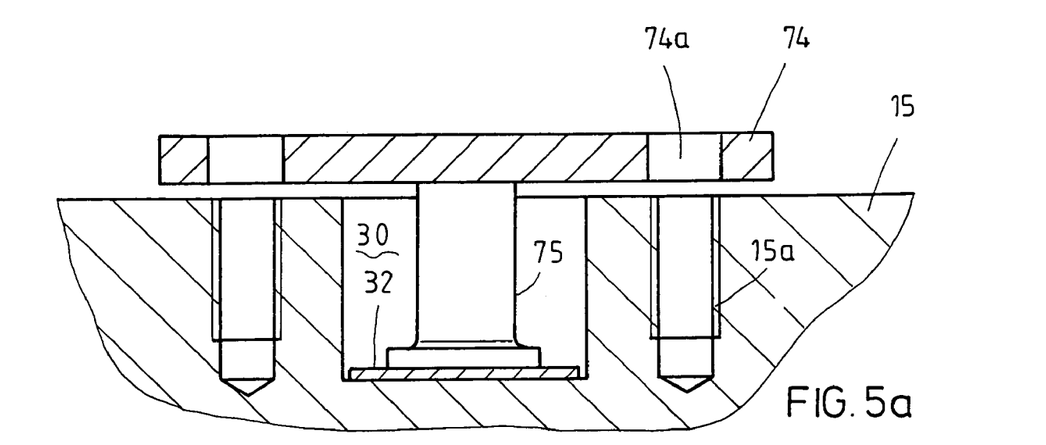
FIG. 5a shows a cross section through the installation region of the strain measuring element with regard to the fixing variant illustrated in FIG. 4b, in the state before the cover is mounted.
Figure 5B:
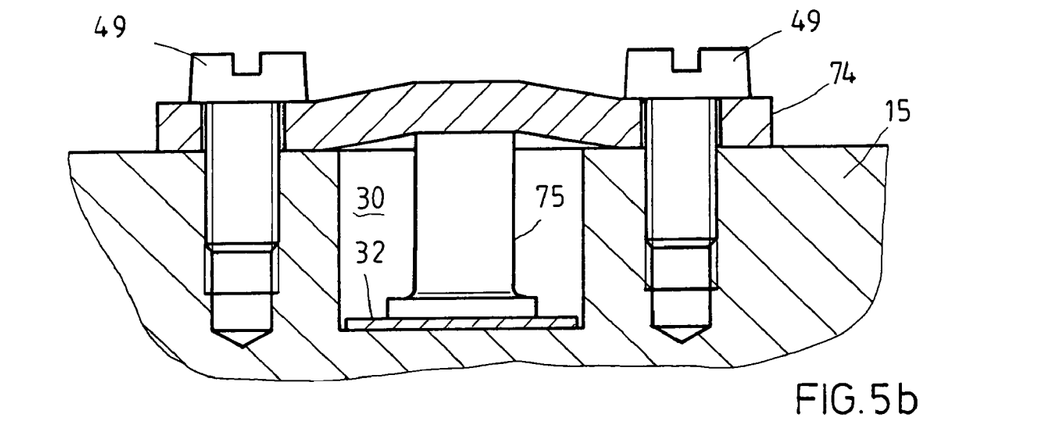
FIG. 5b shows the cross section illustrated in FIG. 5a following the mounting of the cover by means of screw connections.
Figure 5C:
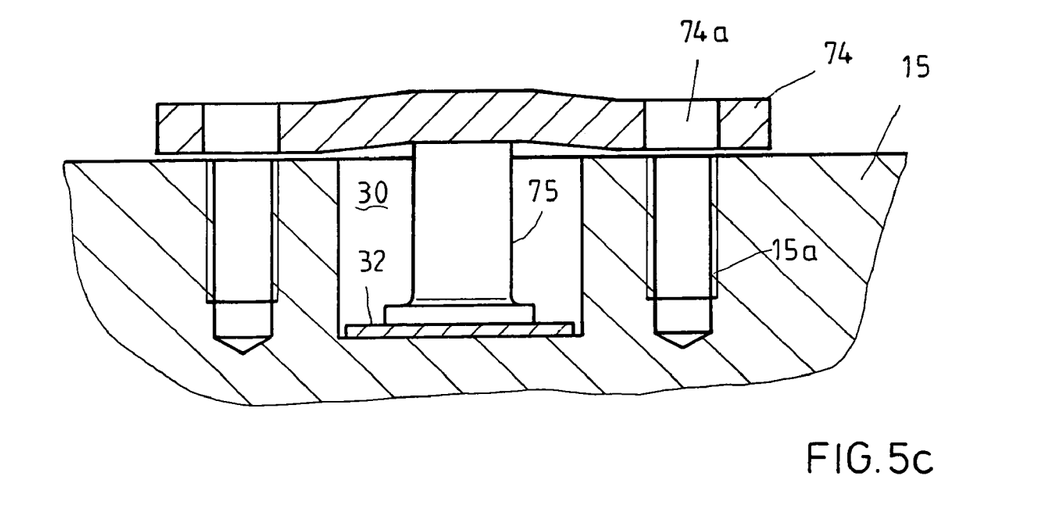
FIG. 5c shows the cross section illustrated in FIG. 5b after the screw connections have been loosened.

FIGS. 5a, 5b and 5c show a cross section through the lower link 15 in the region of opposite screws 49. Also illustrated are the cover 74, holes 74a made in the latter, the depression 30, the carrier element 32 and the pins 75. In relation to the depth of the depression 30, the pins 75 have an excessive length between their upper edge and the carrier element, that is to say they protrude somewhat from the depression 30. In order to fix the pins 75 and the cover 74, the pins 75 are arranged above the end sections 32e1, 32e2 of the carrier element 32. The cover 74 is arranged with its holes 74a opposite corresponding threaded holes 15a in the lower link 15. When the screws 49 are inserted and tightened, the cover 74 deforms plastically, maintaining residual elasticity, as illustrated in FIG. 5b. After removal of the screws 49, the cover 74 remains plastically deformed, as shown in FIG. 5c. The residual elasticity that is present effects the clamping force on the pins 75. The cover 74 is fabricated from a thin metal sheet in a suitable fashion. The clamping force can be defined by the thickness of the metal sheet. This clamped fixing variant permits great tolerances in the fabrication of the depression 30 as a result of the plastic deformability of the cover, so that the depression 30 or a lower link 15 which has such a depression 30 can be produced cost-effectively. In addition, it is also possible to compensate for different material thicknesses of the carrier element.

As a result of the clamped fixings described, simple and reliable fixing of the carrier element 32 to the base 40 is achieved. Mechanical external stresses, such as can occur during welding or screwing the carrier element 32 to the base 40, do not occur. Thus, the strain measuring element 28 is ready to operate immediately after being installed, without any compensation for mechanical external stresses having to be carried out. In addition, in the case of a clamped fixing, overload protection for the carrier element 32 and strain gage 33 fitted to the latter can be achieved in a simple way, by the pressing force being chosen such that the frictional connection transmits at most the maximum permissible strain force.

In order to keep the effort expended for fitting a lower link with the force sensor 25 according to the invention, the strain measuring element 28, the measuring amplifier and the fixing device can be provided as a preassembled strain measuring sensor.

Figure 6:
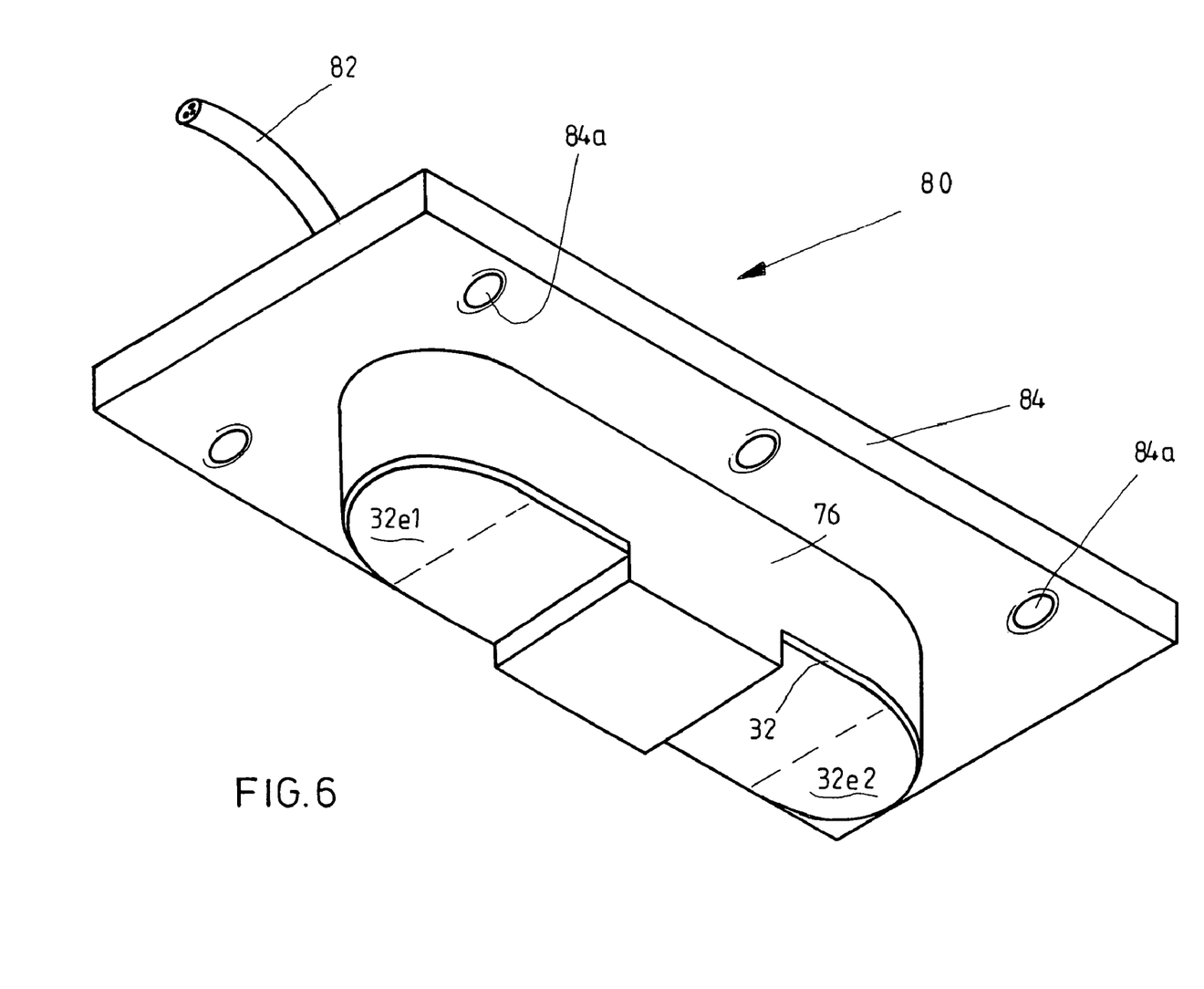
FIG. 6 shows a strain sensor in the form of a preassembled, partly potted, component.

Such a preassembled strain measuring sensor 80 is illustrated in FIG. 6. The strain measuring sensor 80 is formed in such a way that it can simply be inserted into a depression 30 made in the lower link 15. The dimensions of the strain measuring sensor 80, together with the depth of the depression, are chosen such that the strain measurement is carried out on the neutral axis of the lower link 15. Applied to the cover 84, which has holes 84a for screwing to the lower link 15, is an elastic potting compound 76. This encloses the region of the strain measuring sensor 80 between the cover 84 and the carrier element 32. Furthermore, the central region 32m of the carrier element 32 is also enclosed by the potting compound, in order to protect strain gages 33 arranged thereon. The end sections 32e1, 32e2 of the carrier element 32 are not covered by the potting compound 76, so that a reliable frictional connection is achieved between the end sections 32e1, 32e2 and the base 40 of the depression 30. The region enclosed by the potting compound 76 also contains pins 75 or spring packs 71, which are arranged between the end sections 32e1, 32e2 and the cover 84, and also the measuring amplifier for amplifying the signals from the strain gage 33. A cable 82, which carries the power supply of the measuring amplifier and the output signals, is led through the cover 84.

By inserting the strain measuring sensor 80 into the depression 30 and screwing the cover 84 to the lower link 15, the clamped fixing described by using FIG. 4a or 4b is achieved. As a result of the encapsulation with the potting compound 76, the individual elements of the strain measuring sensor 80 are kept in position in relation to one another and are additionally protected against weathering and dirt. Thus, the strain measuring sensor 80 is ready for operation immediately after insertion and screw fixing.

Alternatively, the strain measuring sensor 80 can also be fixed to the lower link 15 by adhesive bonding. The pins 75 and spring packs 71 are then omitted. However, it is necessary to take care that only the end sections 32e1 and 32e2 of the carrier element 32 are bonded to the base 40 of the depression 30. If appropriate, the cover 84 can also be bonded to the lower link outer surface.

Figure 7A:
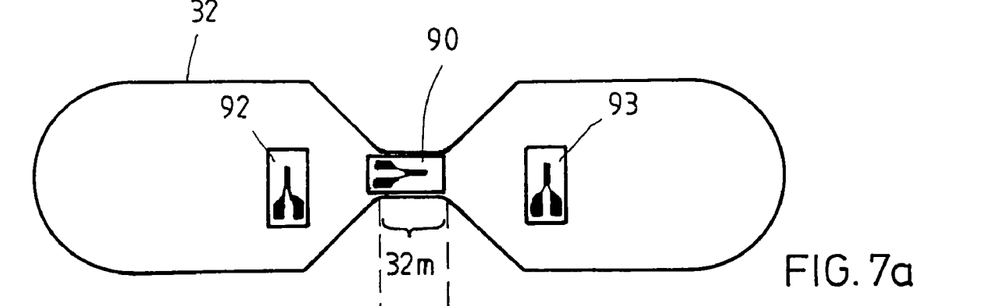
FIG. 7a shows a carrier element fitted with a plurality of strain gages in plan view.
Figure 7B:
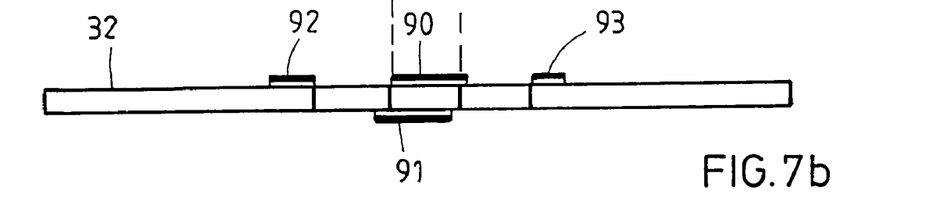
FIG. 7b shows the carrier element illustrated in FIG. 7a in side view.

By using a plurality of strain gages, the strain measuring element 28 can be improved further with regard to resolution. The carrier element 32 already described, on which a plurality of strain gages 90, 91, 92, 93 are now arranged, is illustrated in FIGS. 7a and 7b. The strain gages 90 and 91 are connected to the central region 32m of the carrier element 32. The strain gage 90 is arranged on the upper side and the strain gage 91 is arranged on the underside of the carrier element 32. The strain gages 90, 91 are oriented in such a way that they measure the strain of the central region 32m in the longitudinal direction of the carrier element 32. The strain gages 92 and 93 are arranged on the upper side on the left and right of the central region 32m and are oriented at right angles to the strain gages 90 and 91.

Figure 7C:
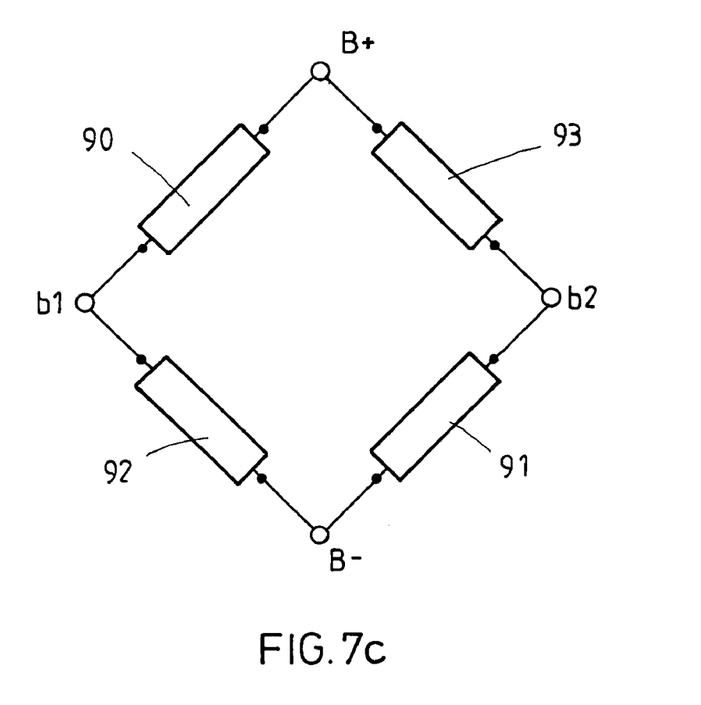
FIG. 7c shows the electric wiring of the strain gages illustrated in FIGS. 7a and 7b.

The electric wiring of the strain gages 90, 91, 92, 93 is illustrated in FIG. 7c. The strain gages 90, 91, 92, 93 are connected into a full bridge circuit. The voltage supply is fed into terminals B+ and B−. An output signal for the measuring amplifier is tapped off at the terminals b1 and b2. The strain gages 90 and 91 are located diagonally opposite in the full bridge circuit, so that a change in the length of the central region 32m leads to a larger signal than would be the case if a single strain gage were used. The strain gages 92 and 93 which are arranged at right angles to the direction of the strain are used as reference resistors. As a result, the configuration of 4 strain gages illustrated in FIGS. 7a, 7b and 7c is largely temperature-compensated.

The strain measuring element can comprise a ceramic circuit board serving as carrier element 32, which is provided with one or more thin-layer strain gages serving as displacement transducers.

Instead of the strain gages used in the exemplary embodiments, a magneto-elastic transmitter can also be used as a displacement transducer.

The present invention is not restricted to force sensors that can be used in lower links. Viewed in general, the force measuring apparatus according to the invention comprises a force-transmitting component on which a strain measuring element is held which comprises a carrier element and a displacement transducer. Carrier element and displacement transducer are fixedly connected to one another in a central region of the carrier element. Only the end regions of the carrier element are connected to the force-transmitting component. As explained in the following text, the force measuring apparatus according to the invention can be transferred to various further application areas.

Figure 8A:
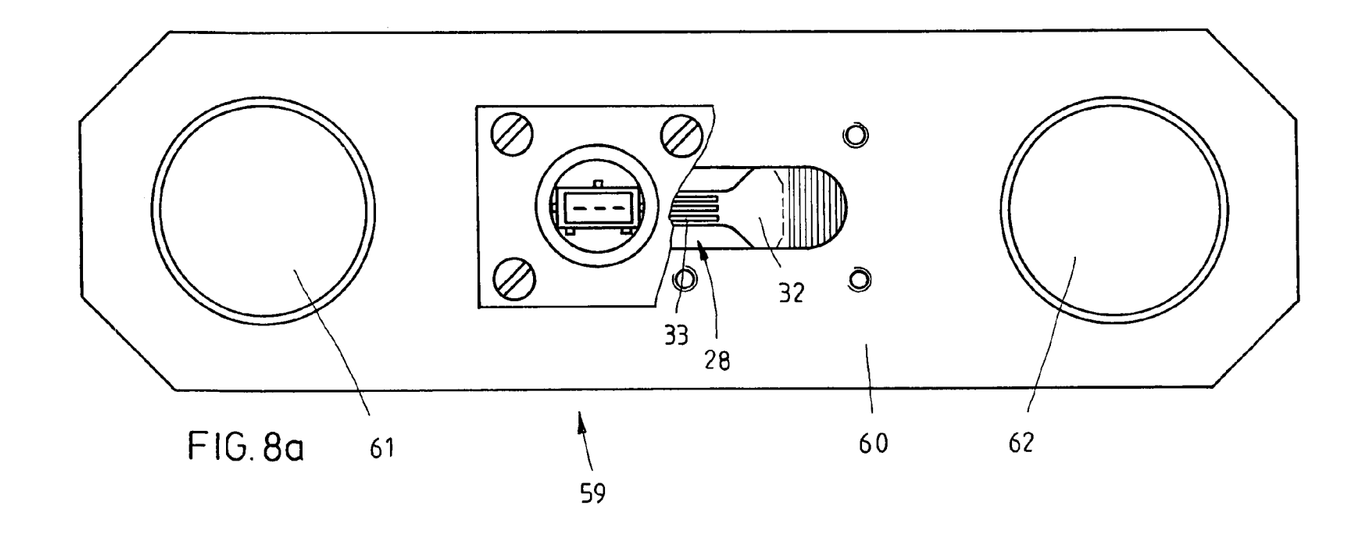
FIG. 8a shows the side view of a force sensor formed as a link plate.
Figure 8B:
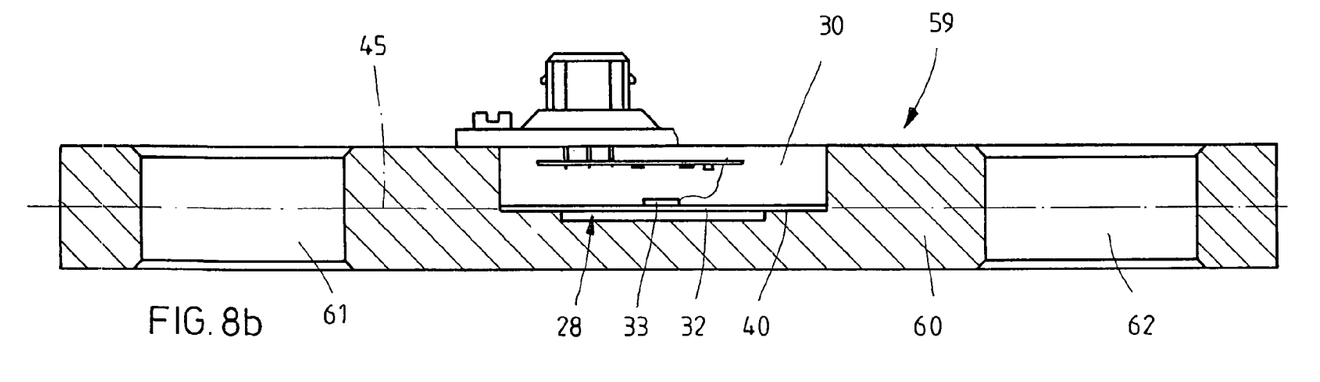

FIGS. 8a and 8b show a force measuring apparatus 59 according to the invention in which the force-transmitting component is formed as a link plate 60. The link plate 60 is provided with an eye 61 and 62, respectively, at each of its longitudinal ends. The eyes 61 and 62 are used to hold connecting elements for universal use of the force measuring apparatus, for example including in the force flow of lifting appliances. The further structure of the force measuring apparatus 59 is the same as the structure of the force measuring apparatus described in FIGS. 2a and 2b, and will therefore not be described again in detail here. The further refinements previously described, in particular the use of a clamped fixing for the carrier element 32, or the integration of the strain measuring element 28 into a preassembled strain sensor 80, can be transferred to the force measuring apparatus 59 formed as a link plate 60 without any modification or with slight modification.

The invention claimed is:

1. A force measuring apparatus in the form of a force-transmitting component (15, 60) comprising a strain measuring element (28) which is held on the component (15, 60) and which converts a force-dependent strain along a direction of the strain of the component (15, 60) into an electric signal; wherein
   the strain measuring element (28) comprises a carrier element (32) and a displacement transducer (33) fixed to the carrier element;
   the carrier element (32) is fixed to the component (15, 60) by two fixing sections (32e1, 32e2) at a predefined distance (a) from each other in the direction of the strain;
   the carrier element (32) has a strain section (32m), which is provided between the fixing sections (32e1, 32e2), the strain section has a shorter length (d) in the direction of the strain than the distance (a) between the fixing sections (32e1, 32e2), and has a smaller cross section than the remaining carrier element (32); and
   the displacement transducer (33) is connected to the strain section (32m) in order to register the strain of the strain section (32m);
   wherein the fixing sections of the carrier are held on the component by means of a clamped connection that is formed by a cover (70) which is held on the component and which terminates a depression (30), and by spring elements (71) clamped in between the cover and the fixing sections.

2. The force measuring apparatus as claimed in claim 1, wherein a recess (41), which has a greater length in the direction of the strain than the strain section (32m), is provided on the component (15, 60), and wherein the strain section (32m) arid regions of the carrier element (32) adjacent thereto are arranged above the recess (41).

3. The force measuring apparatus as claimed in claim 1, wherein the depression (30) is formed in such a way that the strain measuring element (28) is located in the region of the neutral axis (45) of the component (15; 60).

4. The force measuring apparatus as claimed in claim 1, wherein the carrier element (32) is adhesively bonded to the component (15, 60) in the fixing sections (32e1, 32e2).

5. The force measuring apparatus as claimed in claim 4, wherein the carrier element (32) is provided with first toothing (35, 36) in its end regions (32e1, 32e2);
the component is provided with second toothing (40t1, 40t2) which has play with respect to the first toothing (35, 36); and
the two toothing systems (35 and 36, 40t1 and 40t2) are in each case adhesively bonded to each other.

6. The force measuring apparatus as claimed in claim 1, wherein an electric connecting plug (48) or a connecting cable (82) is arranged on the cover (48a, 84).

7. The force measuring apparatus as claimed in claim 1, wherein the displacement transducer is a strain gage (33).

8. The force measuring apparatus as claimed in claim 7, wherein the strain measuring element (28) is a ceramic circuit board provided with a thin-layer strain gage (90, 91, 92, 93).

9. The force measuring apparatus as claimed in claim 1, wherein the displacement transducer is a magneto-elastic transmitter.

10. The force measuring apparatus as claimed in claim 1, wherein the force measuring apparatus is formed as a lower link (15) of a lifting mechanism (11) of an agricultural machine (10).

11. The force measuring apparatus as claimed in claim 10, wherein the lower link (15) has an eye at each of its ends, of which one end (26) faces the machine (10) and the other end faces the lifting mechanism (11), and that the depression (30) for accommodating the strain measuring element (28) is arranged in the vicinity of a machine-side eye (26).

12. The force measuring apparatus as claimed in claim 1, wherein the force measuring apparatus is formed as a link plate (60), which is provided with an eye (61, 62) at each of its longitudinal ends.

13. A force measuring apparatus in the form of a force-transmitting component (15, 60) comprising a strain measuring element (28) which is held on the component (15, 60) and which converts a force-dependent strain along a direction of the strain of the component (15, 60) into an electric signal; wherein
the strain measuring element (28) comprises a carrier element (32) and a displacement transducer (33) fixed to the carrier element;
the carrier element (32) is fixed to the component (15, 60) by two fixing sections (32e1, 32e2) at a predefined distance (a) from each other in the direction of the strain;
the carrier element (32) has a strain section (32m), which is provided between the fixing sections (32e1, 32e2), the strain section has a shorter length (d) in the direction of the strain than the distance (a) between the fixing sections (32e1, 32e2), and has a smaller cross section than the remaining carrier element (32); and
the displacement transducer (33) is connected to the strain section (32m) in order to register the strain or the strain section (32m);
wherein the fixing sections of the carrier are held in the component by means of a clamped connection that is formed by a cover (74) which is held on the component and which terminates a depression (30), and by pins (75) clamped in between the cover (74) and the fixing sections (32e1, 32e2).

14. The force measuring apparatus as claimed in claim 13, wherein the pins (75) in each case have a greater length than the depth from an upper edge of the depression (30) as far as one of the fixing sections (32e1, 32e2).

15. The force measuring apparatus as claimed in claim 14, wherein the cover (74) can be deformed plastically while maintaining residual elasticity as the pins (75) are clamped in.

16. The force measuring apparatus as claimed in claim 13, wherein the strain measuring element (28), the cover (74, 84), the pins (75) and an electronic amplifier circuit for amplifying an electric signal from the displacement transducer (33) form a preassembled structural unit (30) for insertion into the depression (70), and that the preassembled structural unit (80) can be fixed to the component (15) in such a way that the fixing sections (32e1, 32e2) have a clamped connection to the base (40) of the depression (30).

17. The force measuring apparatus as claimed in claim 16, wherein the preassembled structural unit (80) is enclosed by an elastic potting compound (76), at least between the cover (84) and the carrier element (32), and wherein the side of the fixing sections (32e1, 32e2) that faces the base (40) of the depression (30) is not covered by the potting compound (76).

18. A strain measuring element for fitting to a force-transmitting component (15, 60) in order to convert the force-dependent strain of the component (15, 60) into an electric signal, the strain measuring element comprising an elongate carrier element (32) and a displacement transducer (33) fixed thereto;
wherein the carrier element (32) has two fixing sections (32e1, 32e2) for the fixing to the component, the fixing sections (32e1, 32e2) having a predefined distance (a) from each other in a longitudinal direction of the carrier element (32);
the carrier element (32) has a strain section (32m) which is provided between the fixing sections (32e1, 32e2) and which has a shorter length (d) in the longitudinal direction than the distance (a) between the fixing sections (32e1, 32e2), and the strain section has a smaller cross section than the remaining carrier element (32); and
the displacement transducer (33) is connected to the strain section (32m) in order to register the strain of the strain section (32m);
wherein the strain measuring element is insertable as a preassembled structural unit (80) into a depression (30) in the component (15, 60) and has:
a cover (84) for covering the depression (30) in the component (15, 60), an electronic amplifier circuit in order to amplify an electric signal from the displacement transducer (33); and
an elastic potting compound (76) which is provided between the cover (84) and the carrier element (32) and partly encloses the strain measuring element, and wherein a side of the fixing sections (32e1, 32e2) that faces a base (40) of the depression (30) is not covered by the potting compound (76).

* * * * *